United States Patent
Eyole et al.

(10) Patent No.: US 11,093,243 B2
(45) Date of Patent: Aug. 17, 2021

(54) VECTOR INTERLEAVING IN A DATA PROCESSING APPARATUS

(71) Applicant: ARM LIMITED, Cambridge (GB)

(72) Inventors: Mbou Eyole, Soham (GB); Nigel John Stephens, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/630,622

(22) PCT Filed: Jul. 2, 2018

(86) PCT No.: PCT/GB2018/051854
§ 371 (c)(1),
(2) Date: Jan. 13, 2020

(87) PCT Pub. No.: WO2019/016508
PCT Pub. Date: Jan. 24, 2019

(65) Prior Publication Data
US 2021/0026629 A1   Jan. 28, 2021

(30) Foreign Application Priority Data
Jul. 20, 2017   (GB) .................................... 1711707

(51) Int. Cl.
*G06F 9/30* (2018.01)
*G06F 9/38* (2018.01)

(52) U.S. Cl.
CPC ........ *G06F 9/30036* (2013.01); *G06F 9/3001* (2013.01); *G06F 9/30032* (2013.01); *G06F 9/30109* (2013.01); *G06F 9/3895* (2013.01)

(58) Field of Classification Search
None
See application file for complete search history.

(56) References Cited

U.S. PATENT DOCUMENTS 5,845,112 A    12/1998 Nguyen et al.
6,115,812 A *  9/2000 Abdallah ............ G06F 9/30014
                                                   708/520

(Continued)

OTHER PUBLICATIONS

Robert Bedichek, "Some Efficient Architecture Simulation Techniques", Proceedings of the Winter 1990 USENIX Conference, Jan. 22-26, 1990, 12 pages.

(Continued)

*Primary Examiner* — Eric Coleman
(74) *Attorney, Agent, or Firm* — Nixon & Vanderhye P.C.

(57) ABSTRACT

Vector interleaving techniques in a data processing apparatus are disclosed, comprising apparatuses, instructions, methods of operating the apparatuses, and simulator implementations. A vector interleaving instruction specifies a first source register, second source register, and destination register. A first set of input data items is retrieved from the first source register and a second set of input data items from the second source register. A data processing operation is performed on selected input data item pairs taken from the first and second set of input data items to generate a set of result data items, which are stored as a result data vector in the destination register. First source register dependent result data items are stored in a first set of alternating positions in the destination data vector and second source register dependent result data items are stored in a second set of alternating positions in the destination data vector.

14 Claims, 11 Drawing Sheets

(56) References Cited

U.S. PATENT DOCUMENTS

| | | | |
|---|---|---|---|
| 6,211,892 B1* | 4/2001 | Huff | G06T 15/005 |
| | | | 345/506 |
| 6,418,529 B1 | 7/2002 | Roussel | |
| 9,146,738 B2* | 9/2015 | Morris | G06F 9/30021 |
| 2004/0210616 A1* | 10/2004 | Debes | G06F 9/30014 |
| | | | 708/523 |
| 2007/0192396 A1* | 8/2007 | Pedersen | G06F 9/30036 |
| | | | 708/505 |
| 2008/0140750 A1 | 6/2008 | Kershaw et al. | |
| 2008/0270768 A1 | 10/2008 | Khan et al. | |
| 2009/0055455 A1* | 2/2009 | Matsuyama | G06F 9/3885 |
| | | | 708/231 |
| 2010/0106944 A1 | 4/2010 | Symes et al. | |
| 2013/0212360 A1* | 8/2013 | Sperber | G06F 9/30032 |
| | | | 712/210 |
| 2014/0013075 A1* | 1/2014 | Hagog | G06F 9/30185 |
| | | | 712/4 |
| 2014/0201502 A1* | 7/2014 | Ould-Ahmed-Vall | G06F 9/30018 |
| | | | 712/221 |
| 2016/0179522 A1* | 6/2016 | Gorbal | G06F 9/30032 |
| | | | 712/5 |

OTHER PUBLICATIONS

International Search Report and Written Opinion of the ISA for PCT/GB2018/051854 dated Nov. 27, 2018, 23 pages.

Examination Report for GB Application No. 1711707.8 dated Apr. 29, 2020, 5 pages.

M. Scarpino "Crunching Numbers with AVX and AVX2" Codeproject.com, Apr. 2016, https://www.codeproject.com/Articles/874396/Crunching-Numbers-with-AVX-and-AVX, 17 pages.

Examination Report issued for GB Application No. 1711707.8 dated Oct. 6, 2020, 3 pages.

Examination Report for GB Application No. 1711707.8 dated Mar. 1, 2021, 4 pages.

\* cited by examiner $$\underbrace{\{X_1, X_0\} * \{Y_1, Y_0\}}_{256\text{-BIT}} = \text{H\_128 } \{P1, P0 \wedge P1 \wedge Q1 \wedge R1\},$$
$$\text{L\_128 } \{Q1 \wedge P0 \wedge Q0 \wedge R0, Q0\},$$

where:
$\{P1, P0\} = X1 * Y1$
$\{Q1, Q0\} = X0 * Y0$
$\{R1, R0\} = (X0 \wedge X1) * (Y0 \wedge Y1)$ let vectors:
$zX = \{...., X1, X0\}$ and $zY = \{...., Y1, Y0\}$
         $\underbrace{\phantom{XXXX}}_{128\text{-BIT}}$              $\underbrace{\phantom{XXXX}}_{128\text{-BIT}}$

FIG. 7

VECTOR INTERLEAVING IN A DATA PROCESSING APPARATUS

This application is the U.S. national phase of International Application No. PCT/GB2018/051854 filed Jul. 2, 2018 which designated the U.S. and claims priority to GB Application No. 1711707.8 filed Jul. 20, 2017, the entire contents of each of which are hereby incorporated by reference.

The present disclosure relates to a data processing apparatus. More particularly it relates to vector processing operations which the data processing apparatus may carry out.

In a data processing apparatus which performs data processing operations on a set of input data items, greater processing efficiency and throughput is gained if the input data items can be processed in a vectorised manner, in which groups of data items across the width of the vector are subjected to the same data processing in parallel, rather than for example taking a sequential processing approach in which these would be processed one after the other. Nevertheless a vectorised approach to applying data processing to input data items from source registers and storing the results in a destination register can impose certain limitations on the kinds of data processing that can be performed and the combinations of input data items forming the operands of those data processing operations if a practicable data processing apparatus is to be provided without undue complexity, which could render the advantages of the vectorised approach to be not worthwhile.

In one example embodiment there is an apparatus comprising instruction decoder circuitry to decode instructions; and data processing circuitry to selectively apply vector processing operations specified by the instructions to input data vectors comprising a plurality of input data items at respective positions in the input data vectors, wherein the instruction decoder circuitry is responsive to a vector interleaving instruction specifying a first source register, a second source register, and a destination register to generate control signals to control the data processing circuitry to carry out a vector interleaving process to: retrieve a first set of input data items from the first source register; retrieve a second set of input data items from the second source register; perform a data processing operation on at least selected input data item pairs taken from the first and second set of input data items to generate a set of result data items; and store the set of result data items as a result data vector in the destination register, wherein first source register dependent result data items which have a first source register content dependency are stored in a first set of alternating positions in the destination data vector, and wherein second source register dependent result data items which have a second source register content dependency are stored in a second set of alternating positions in the destination data vector.

In another example embodiment there is a method of operating a data processing apparatus comprising the steps of: decoding instructions; selectively applying vector processing operations specified by the instructions to input data vectors comprising a plurality of input data items at respective positions in the input data vectors; generating control signals in response to a vector interleaving instruction specifying a first source register, a second source register, and a destination register of the apparatus to control data processing circuitry of the apparatus to carry out a vector interleaving process comprising: retrieving a first set of input data items from the first source register; retrieving a second set of input data items from the second source register; performing a data processing operation on at least selected input data item pairs taken from the first and second set of input data items to generate a set of result data items; and storing the set of result data items as a result data vector in the destination register, wherein first source register dependent result data items which have a first source register content dependency are stored in a first set of alternating positions in the destination data vector, and wherein second source register dependent result data items which have a second source register content dependency are stored in a second set of alternating positions in the destination data vector.

In another example embodiment there is an apparatus comprising: means for decoding instructions; means for selectively applying vector processing operations specified by the instructions to input data vectors comprising a plurality of input data items at respective positions in the input data vectors; means for generating control signals in response to a vector interleaving instruction specifying a first source register, a second source register, and a destination register of the apparatus to control data processing circuitry of the apparatus to carry out a vector interleaving process comprising means for retrieving a first set of input data items from the first source register; means for retrieving a second set of input data items from the second source register; means for performing a data processing operation on at least selected input data item pairs taken from the first and second set of input data items to generate a set of result data items; and means for storing the set of result data items as a result data vector in the destination register, wherein first source register dependent result data items which have a first source register content dependency are stored in a first set of alternating positions in the destination data vector, and wherein second source register dependent result data items which have a second source register content dependency are stored in a second set of alternating positions in the destination data vector.

In another example embodiment there is a computer program for controlling a host data processing apparatus to provide an instructions execution environment comprising: instruction decoding program logic to decode instructions; and data processing program logic to selectively apply vector processing operations specified by the instructions to input data vector structures comprising a plurality of input data items at respective positions in the input data vector structures, wherein the instruction decoding program logic is responsive to a vector interleaving instruction specifying a first source data structure, a second source data structure, and a destination data structure to generate control signals to control the data processing program logic to carry out a vector interleaving process to: retrieve a first set of input data items from the first source data structure; retrieve a second set of input data items from the second source data structure; perform a data processing operation on at least selected input data item pairs taken from the first and second set of input data items to generate a set of result data items; and store the set of result data items as a result data vector structure in the destination data structure, wherein first source data structure dependent result data items which have a first source data structure content dependency are stored in a first set of alternating positions in the destination data vector structure, and wherein second source data structure dependent result data items which have a second source data structure content dependency are stored in a second set of alternating positions in the destination data vector structure.

In another example embodiment there is a computer-readable storage medium storing in a non-transient fashion the above-mentioned computer program.

The present techniques will be described further, by way of example only, with reference to embodiments thereof as illustrated in the accompanying drawings, in which:

FIG. 1 schematically illustrates a data processing apparatus which may embody various examples of the present techniques;

FIG. 2A schematically illustrates data processing circuitry to perform data processing on pairs of elements taken from each of two source registers and to write these in an interleaved manner into a destination register;

FIG. 2B shows example content for the elements of the registers in the example of FIG. 2A;

FIG. 3A schematically illustrates data processing circuitry to perform data processing operations on pairs of data elements taken from a first and second source register and to write the result from each source register in an interleaved manner into the destination register, wherein the data size of the elements written into the destination register can be specified;

FIG. 3B shows example content of elements in the example of FIG. 3A;

FIG. 4A schematically illustrates data processing circuitry in an example in which one of the source registers also provides the destination register;

Figures 5A, 5B:
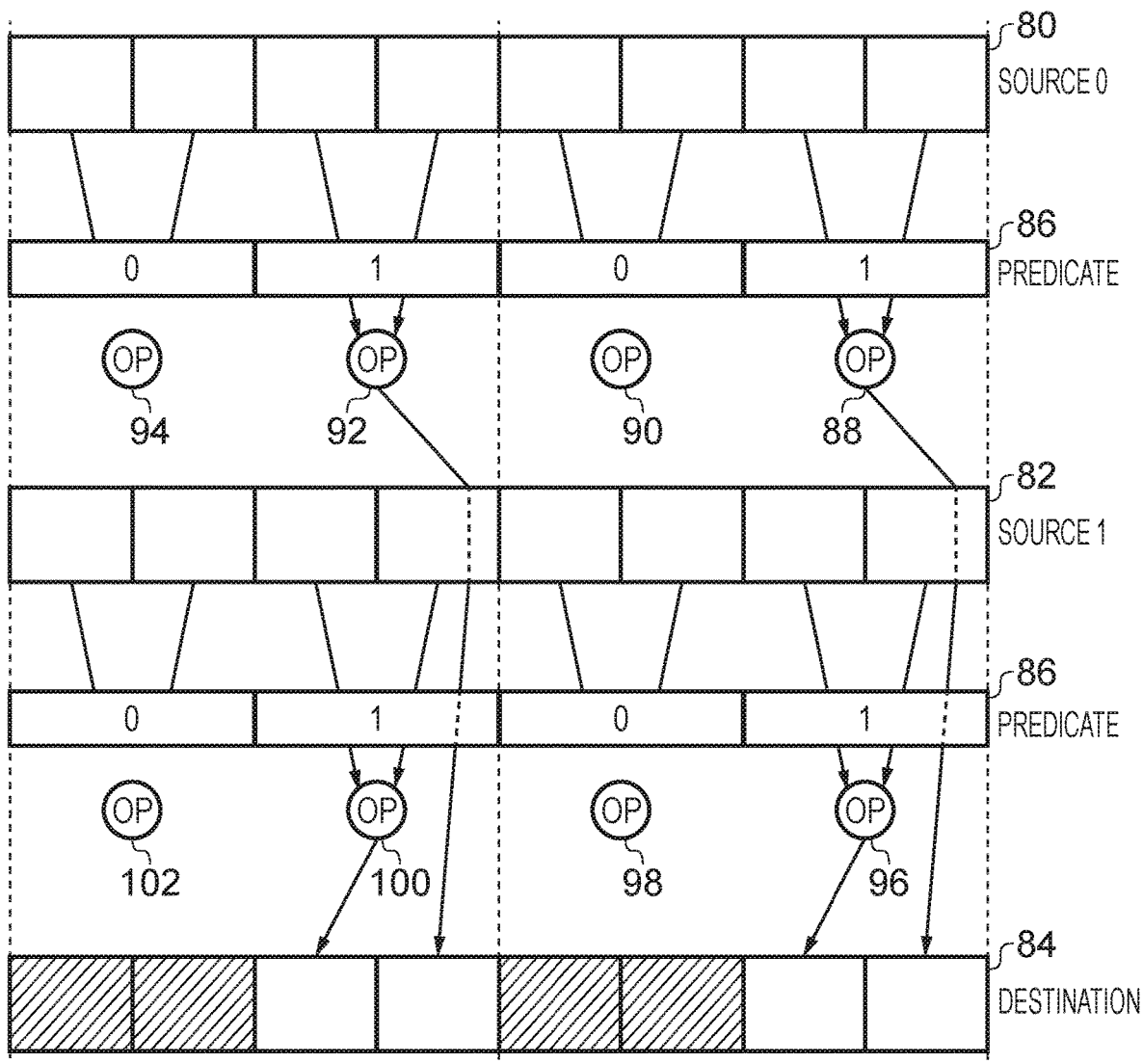
FIG. 5A shows data processing circuitry and registers in one example in which the instruction specifies a predicate value used to selectively enable/disable certain processing.
Figure 6:
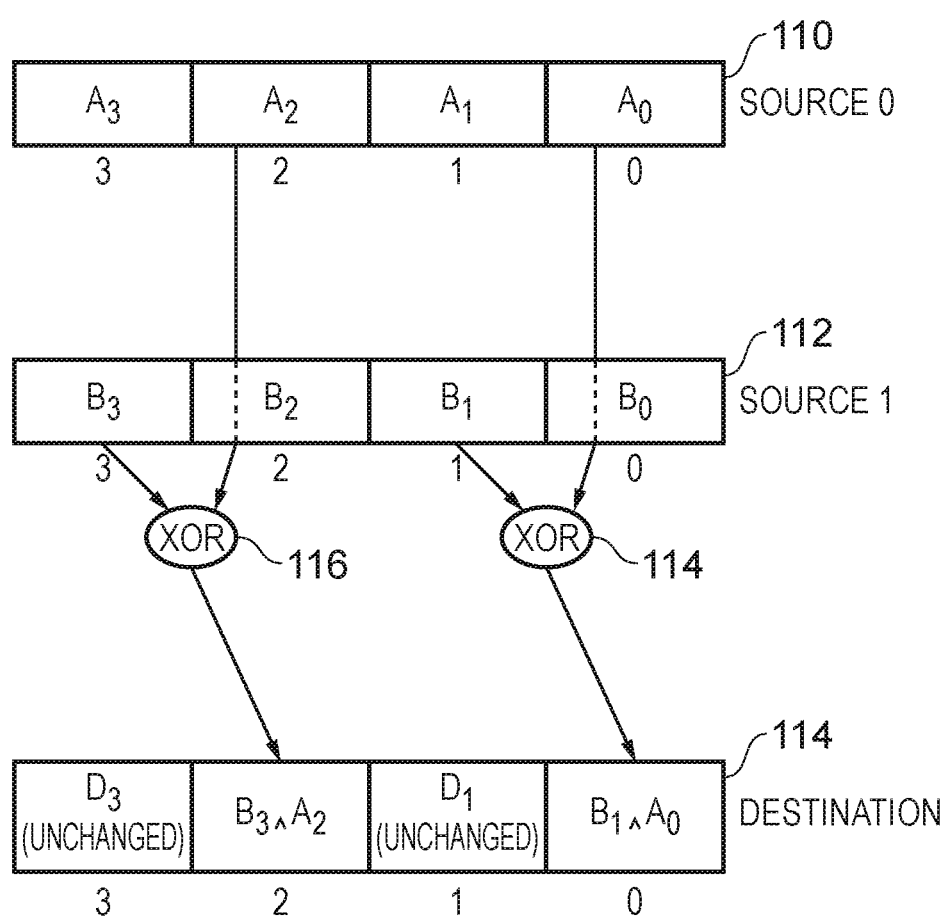
Figure 8:
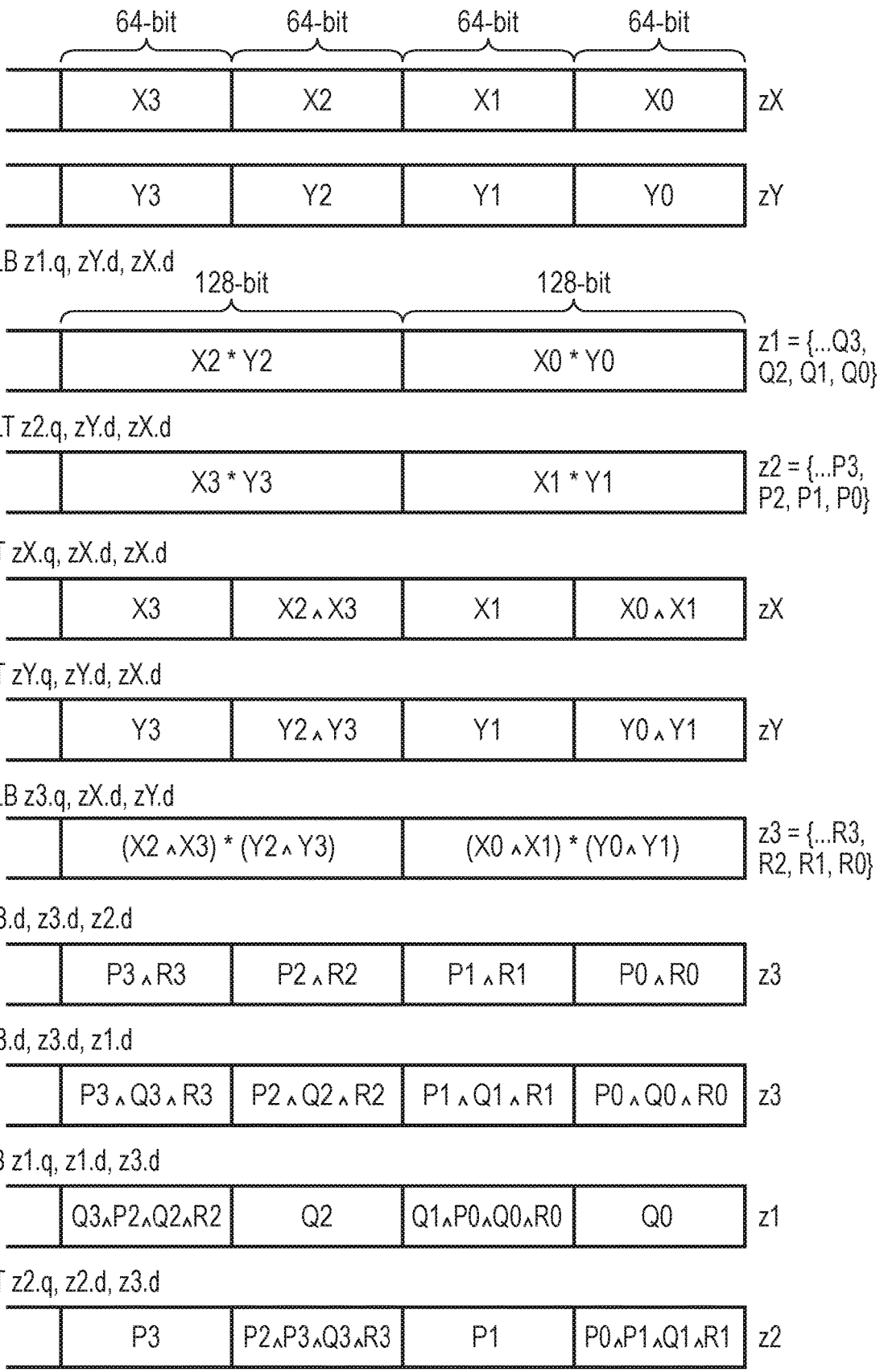
Figure 9:
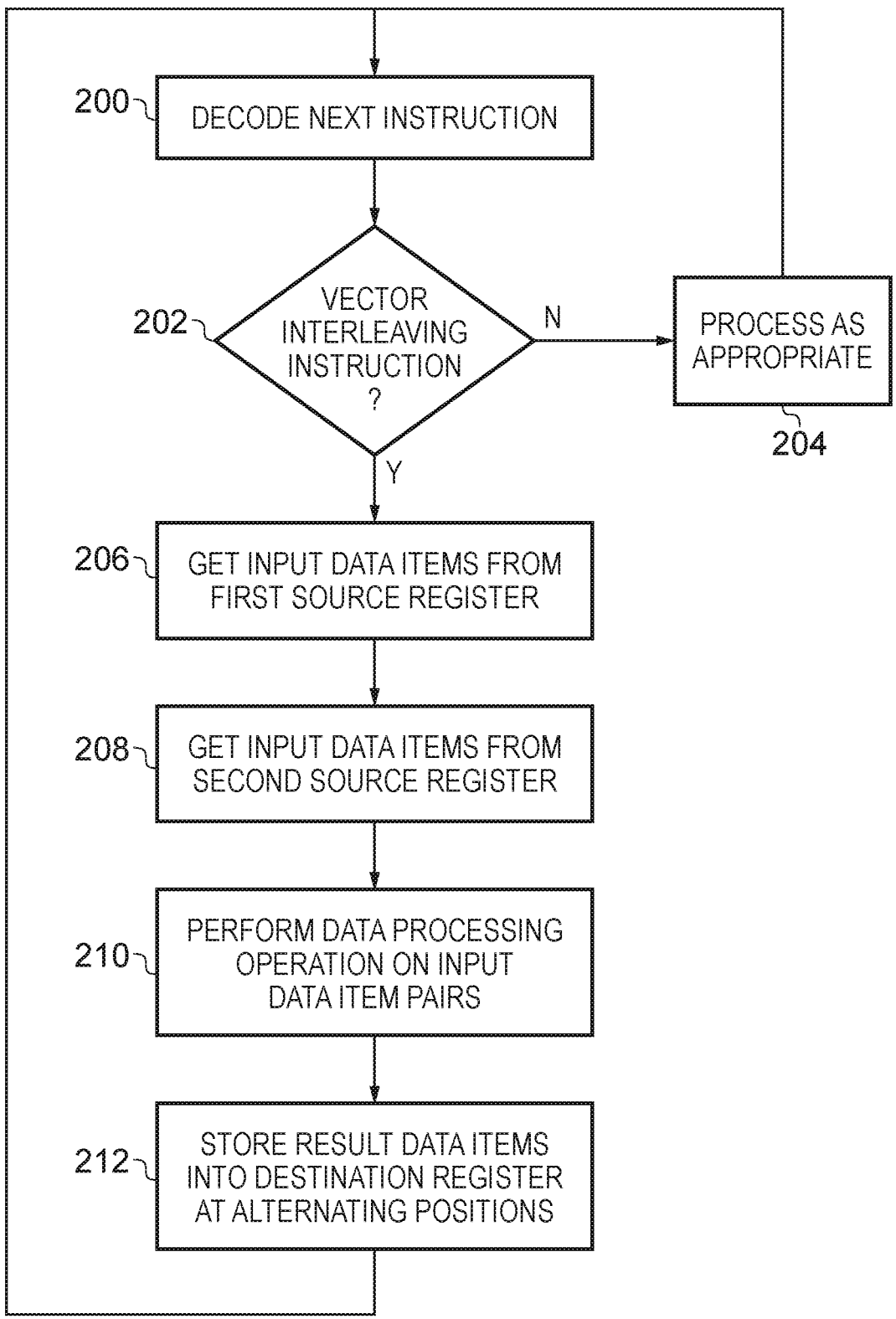
Figure 10:
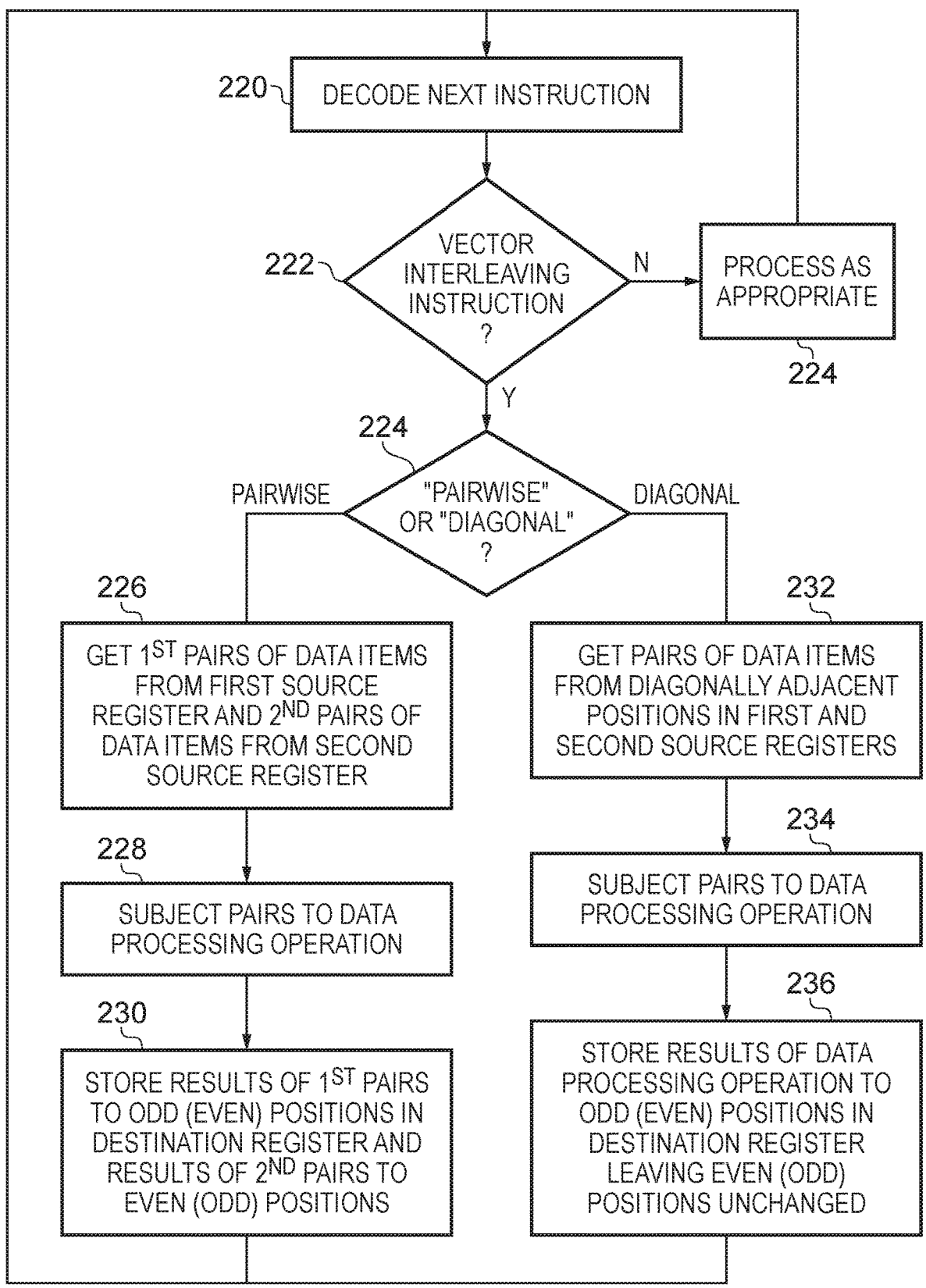

FIG. 5B gives example content of the elements of the registers and the corresponding predicate values in the example of FIG. 5A;

FIG. 6 schematically illustrates data processing circuitry in one example in which pairs of input data items to be subjected to the data processing operation are taken from diagonally adjacent elements of a first and second source register;

FIG. 7 shows some definitions used for an example data processing context of polynomial multiplication in which some instructions of the present techniques are used;

FIG. 8 shows step-by-step register content of the polynomial multiplication example of FIG. 7 with an example sequence of instructions provided by the present techniques to carry out this polynomial multiplication;

FIG. 9 is a sequence of steps in the method of one embodiment;

FIG. 10 is a sequence of steps taken in the method of one embodiment; and

Figure 11:
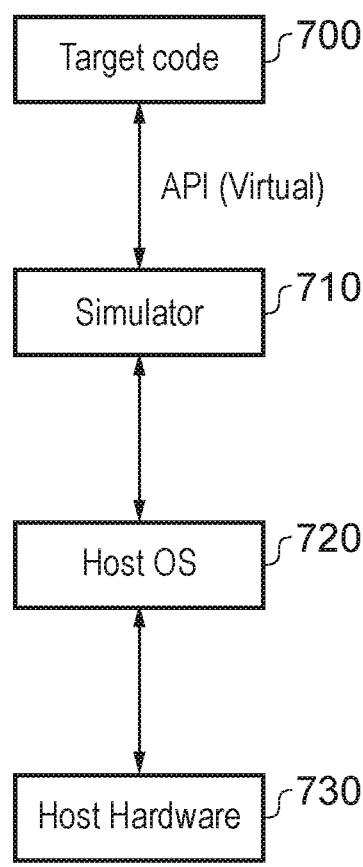

FIG. 11 schematically illustrates the components of a system which provides a simulator implementation in one embodiment.

At least some embodiments provide an apparatus comprising instruction decoder circuitry to decode instructions; and data processing circuitry to selectively apply vector processing operations specified by the instructions to input data vectors comprising a plurality of input data items at respective positions in the input data vectors, wherein the instruction decoder circuitry is responsive to a vector interleaving instruction specifying a first source register, a second source register, and a destination register to generate control signals to control the data processing circuitry to carry out a vector interleaving process to retrieve a first set of input data items from the first source register; retrieve a second set of input data items from the second source register; perform a data processing operation on at least selected input data item pairs taken from the first and second set of input data items to generate a set of result data items; and store the set of result data items as a result data vector in the destination register, wherein first source register dependent result data items which have a first source register content dependency are stored in a first set of alternating positions in the destination data vector, and wherein second source register dependent result data items which have a second source register content dependency are stored in a second set of alternating positions in the destination data vector.

The present techniques recognise that efficiency of processing and less complexity in the necessary hardware are gained in a vector processing approach where there is co-location of the processed input data items and the generated result data items. For example such co-location is achieved in implementations in which processing lanes (within which independent data processing takes place) are well defined and well constrained. In other words this means that the complexity of the hardware required to bring together the required operands of the data processing operation and to transfer the resulting data item to the required position in the destination register are limited. In this context the present techniques have found that it is useful to provide a vector interleaving instruction, which on the one hand causes selected input data item pairs to be taken from the first and second sets of input data items retrieved from the first and second source registers, and which on the other hand causes the result data items to be stored in the destination register in dependence on their source register dependency or dependencies, such that first source register dependent result data items are stored in alternating positions in the destination register and also second source register dependent result data items are stored in alternating positions in the destination register. This configuration enables a useful degree of flexibility in the particular pairings of input data items which are defined and in turns of the alternating positions in the destination register to which the result data items are written. Indeed the present techniques are not limited to a strict pair of input data items, in that the data processing operation may have one or more additional operands beyond the core pair. Nevertheless this approach still provides the above mentioned co-location of related elements involved in the vectorised data processing, avoiding excessive complexity in the supporting hardware which much be provided, but still enabling useful data processing to be carried out for which further associated data processing operations (for example to permute or shuffle content) are not required. Useful efficiency and throughput of the implemented vectorised data processing is thus supported.

As mentioned above the selected data item pairs may be defined in a variety of useful ways, but in some embodiments the selected input data item pairs taken from the first and second set of input data items comprise: a first set of input data item pairs formed of adjacent pairs of input data items in the first source register; and a second set of input data item pairs formed of adjacent pairs of input data items in the second source register. Accordingly, pairs of adjacent elements (input data items) are taken from both the first and second source register, meaning that these input data item operands of the data processing are usefully collocated, but further where the result data items which are generated from them are interleaved with other items in the destination register, thus maximising the destination register utilisation (in that it is fully "packed") further supporting the efficiency and throughput of the vectorised data processing being carried out.

One way of ensuring this full utilisation of the destination register is to interleave result data items derived from the first source register content with result data items derived from the second source register content and thus in some embodiments the first set of alternating positions in the destination data vector alternates with the second set of alternating positions in the destination data vector. In some embodiments the first set of alternating positions is an even numbered set of positions in the destination data vector and the second set of alternating positions is an odd numbered set of positions in the destination data vector. Alternatively in other embodiments the first set of alternating positions is an odd numbered set of positions in the destination data vector and the second set of alternating positions is an even numbered set of positions in the destination data vector.

The selected input data pairs may however be differently defined in other embodiments and in some embodiments the selected input data item pairs taken from the first and second set of input data items comprise diagonal input data item pairs formed of alternating input data items in the first source register paired with alternating input data items in the second source register. In other words, in such embodiments the input data item pairs span the first and second source registers in that one input data item of the pair comes from the first source register, whilst the other input data item of the pair comes from the second source register. Moreover, this pairing is "diagonal" in the sense that the input data items taken from the first source register are at offset positions in that source register with respect to the input data items taken from the second source register, this offset being one data item position. Hence alternating input data items from the first source register are paired with alternating input data items in the second source register taken from an adjacent data item location. Various data processing contexts may benefit from this "diagonal input data item pairs" approach as will become more clear with respect to some examples thereof which follow.

In some embodiments therefore, in which all result data items are dependent on both the first source register and the second source register, the sets defined by first source register dependent result data items and second source register dependent result data items are the same, and thus in some embodiments the first source register dependent result data items and the second source register dependent result data items are a same set of result data items, and the first set of alternating positions and the second set of alternating positions are a same set of alternating positions in the destination data vector. Hence, in terms of the positions in the destination data vector at which the result data items are stored, in such embodiments this therefore means that the above mentioned first set of alternating positions and second set of alternating positions are the same set of alternating positions in the destination data vector.

Accordingly therefore in such embodiments this means that a further set of alternating positions (i.e. those into which result data items are not stored) are available to be populated by other data items. These may be selected in various ways in dependence on what is of benefit to the particular vectorised data processing being performed, but in some embodiments the first set of alternating positions and the second set of alternating positions alternate with a further set of positions at which a set of prior data items remain in the destination data vector, wherein the set of prior data items are present in the further set of positions in the destination data vector before the data processing circuitry begins the vector interleaving process. In other words there is a set of prior data items in the destination data vector which are unchanged (left unamended) by the vector interleaving process.

It will be recognised that depending on requirements the first and second set of positions in the destination data vector could be chosen in some embodiments such that the first set of positions are an even numbered set of positions in the destination data vector and the further set of positions are an odd numbered set of in the destination data vector. Alternatively in other embodiments the first set of positions are an odd numbered set of positions in the destination data vector and the further set of positions are an even numbered set of positions in the destination data vector.

Equally it will also be recognised that the alternating input data items retrieved from the first and second source registers have an equivalent choice associated with them and thus in some embodiments the alternating input data items in the first source register are retrieved from an even numbered set of positions in the first source register and the alternating input data items in the second source register are retrieved from an odd numbered set of positions in the second source register. Alternatively in other embodiments the alternating input data items in the first source register are retrieved from an odd numbered set of positions in the first source register and the alternating input data items in the second source register are retrieved from an even numbered set of positions in the second source register.

The particular data processing operation performed on the input data items may take a variety of forms, but in various embodiments the data processing operation is an arithmetic operation, a logical operation, or a shift operation. Any such operation, suitably configured to respect the constraints of the vectorised "lanes" of the vectorised data processing to be carried out, may be chosen.

In some embodiments the destination register specified in the vector interleaving instruction is a distinct register from the first and second source registers, but in some embodiments the destination register specified in the vector interleaving instruction is one of the first source register and the second source register. This thus provides an at least partially "destructive" approach can be taken in which at least some of the data items of that source register are overwritten by the storing of the set of result data items into this register.

The present techniques provide a further aspect of configurability to the vectorised data processing which is carried out in response to the vector interleaving instruction in that in some embodiments the vector interleaving instruction further specifies a predication value comprising predication bits corresponding to the respective positions in the input data vectors, and the data processing circuitry is further responsive to an unset predication bit in the predication value to suppress involvement of input data item of the first set of input data items and the second set of input data items in the vector interleaving process which correspond to the unset predication bit. Thus further specific control can thus be applied to the processing by the efficient mechanism of setting or unsetting certain predication bits in the predication value. This predication value could be specified in a number of ways in the vector interleaving instruction, either as an immediate value within the interleaving instruction itself, or by means of the vector interleaving instruction indicating a storage location, for example a further register, in which the predication value is to be found.

Another degree of flexibility to the present techniques is provided in embodiments in which the vector interleaving instruction further specifies a first data item size of the first set of input data items, a second data item size of the second set of input data items, and a result data item size of the set of result data items. This approach is not only generally useful in order to be able to control the specific input data items which are retrieved from the first and second source registers, and to control the specific format of the result data items which are stored into the destination register, but can find particular applicability in the context of seeking to maintain processing within the vectorised lanes by specifying data sizes which will respect those lanes appropriately.

This may for example comprise narrowing the result data items, but conversely can also comprise allowing a widening of the result data items (with respect to the input data items), thus for example enabling "carry-less" multiplication to be carried out which does not lose precision, i.e. it preserves all information in the calculation, which can be important in certain contexts, for example in cryptography.

Accordingly, in some embodiments the first data item size and the second data item size of the second set of input data items is smaller than the result data item size of the set of result data items. Alternatively in other embodiments the first data item size and the second data item size of the second set of input data items is larger than the result data item size of the set of result data items.

At least some embodiments provide a method of operating a data processing apparatus comprising the steps of: decoding instructions; selectively applying vector processing operations specified by the instructions to input data vectors comprising a plurality of input data items at respective positions in the input data vectors; generating control signals in response to a vector interleaving instruction specifying a first source register, a second source register, and a destination register of the apparatus to control data processing circuitry of the apparatus to carry out a vector interleaving process comprising: retrieving a first set of input data items from the first source register; retrieving a second set of input data items from the second source register; performing a data processing operation on at least selected input data item pairs taken from the first and second set of input data items to generate a set of result data items; and storing the set of result data items as a result data vector in the destination register, wherein first source register dependent result data items which have a first source register content dependency are stored in a first set of alternating positions in the destination data vector, and wherein second source register dependent result data items which have a second source register content dependency are stored in a second set of alternating positions in the destination data vector.

At least some embodiments provide an apparatus comprising: means for decoding instructions; means for selectively applying vector processing operations specified by the instructions to input data vectors comprising a plurality of input data items at respective positions in the input data vectors; means for generating control signals in response to a vector interleaving instruction specifying a first source register, a second source register, and a destination register of the apparatus to control data processing circuitry of the apparatus to carry out a vector interleaving process comprising: means for retrieving a first set of input data items from the first source register; means for retrieving a second set of input data items from the second source register; means for performing a data processing operation on at least selected input data item pairs taken from the first and second set of input data items to generate a set of result data items; and means for storing the set of result data items as a result data vector in the destination register, wherein first source register dependent result data items which have a first source register content dependency are stored in a first set of alternating positions in the destination data vector, and wherein second source register dependent result data items which have a second source register content dependency are stored in a second set of alternating positions in the destination data vector.

At least some embodiments provide a computer program for controlling a host data processing apparatus to provide an instructions execution environment comprising: instruction decoding program logic to decode instructions; and data processing program logic to selectively apply vector processing operations specified by the instructions to input data vector structures comprising a plurality of input data items at respective positions in the input data vector structures, wherein the instruction decoding program logic is responsive to a vector interleaving instruction specifying a first source data structure, a second source data structure, and a destination data structure to generate control signals to control the data processing program logic to carry out a vector interleaving process to: retrieve a first set of input data items from the first source data structure; retrieve a second set of input data items from the second source data structure; perform a data processing operation on at least selected input data item pairs taken from the first and second set of input data items to generate a set of result data items; and store the set of result data items as a result data vector structure in the destination data structure, wherein first source data structure dependent result data items which have a first source data structure content dependency are stored in a first set of alternating positions in the destination data vector structure, and wherein second source data structure dependent result data items which have a second source data structure content dependency are stored in a second set of alternating positions in the destination data vector structure.

At least some embodiments provide a computer-readable storage medium storing in a non-transient fashion the above-mentioned computer program.

Some particular embodiments are now described with reference to the figures.

Figure 1:
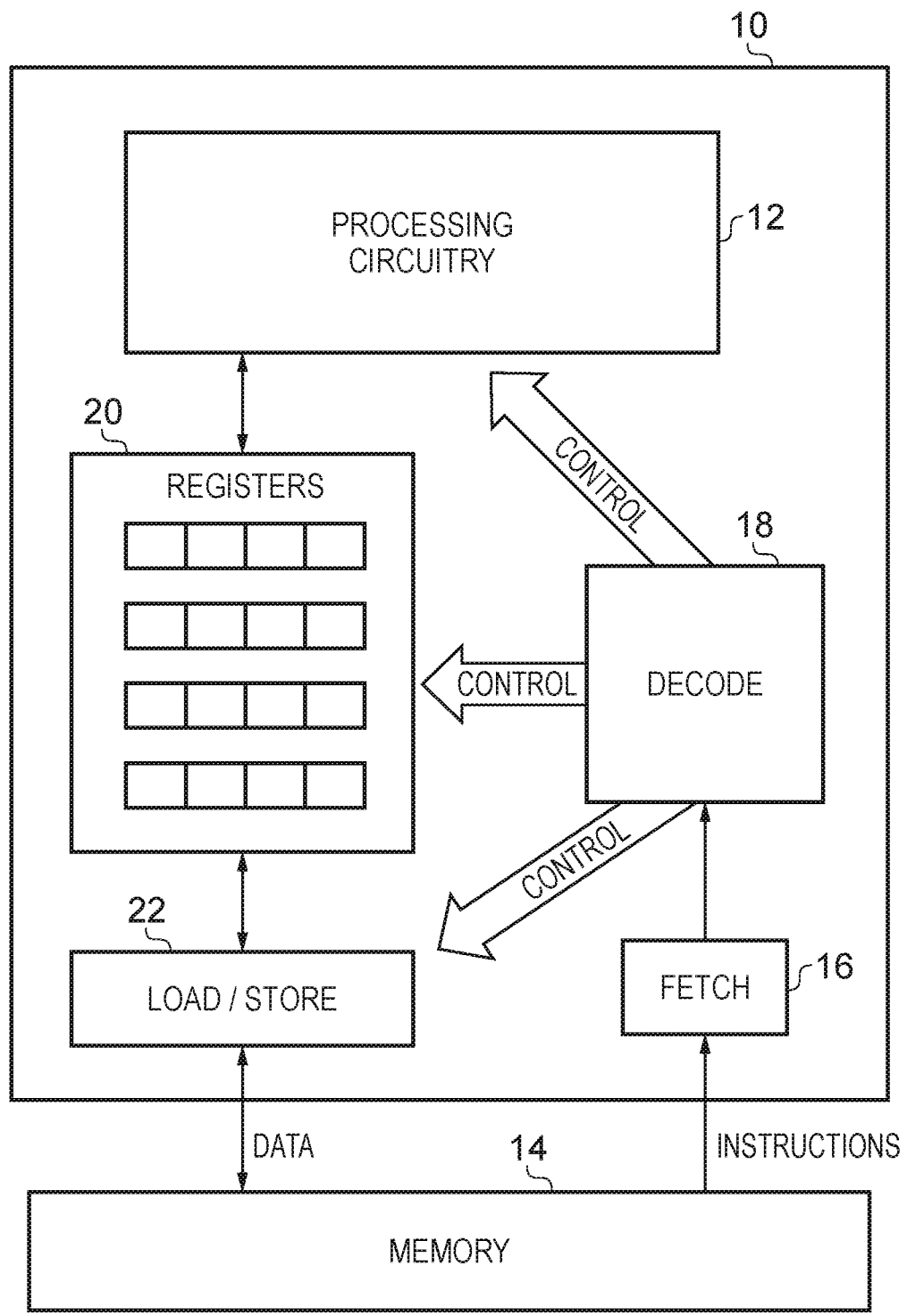

FIG. 1 schematically illustrates a data processing apparatus 10 which may embody various examples of the present techniques. The apparatus comprises data processing circuitry 12 which performs data processing operations on data items in response to a sequence of instructions which it executes. These instructions are retrieved from the memory 14 to which the data processing apparatus has access and, in a manner with which one of ordinary skill in the art will be familiar, fetch circuitry 16 is provided for this purpose. Furthermore, instructions retrieved by the fetch circuitry 16 are passed to the instruction decoder circuitry 18, which generates control signals which are arranged to control various aspects of the configuration and operation of the processing circuitry 12, as well as of a set of registers 20 and a load/store unit 22. Generally, the data processing circuitry 12 may be arranged in a pipelined fashion, yet the specifics thereof are not relevant to the present techniques. One of ordinary skill in the art will be familiar with the general configuration which FIG. 1 represents and further detail description thereof is dispensed herewith merely for the purposes of brevity. The registers 20, as can be seen in FIG. 1, each comprise storage for multiple data elements, such that the processing circuitry can apply data processing operations either to a specified data element within a specified register, or can apply data processing operations to a specified group of data elements (a "vector") within a specified register. In particular the illustrated data processing apparatus is concerned with the performance of vectorised data processing operations, and specifically to the execution of vector interleaving instructions, with respect to data elements held in the registers 20, further explanation of which will follow in more detail below with reference to some specific embodiments. Data values required by the data processing circuitry 12 in the execution of the instructions, and data values generated as a result of those data processing instructions, are written to and read from the memory 14 by means of the load/store unit 22. Note also that generally the memory 14 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such in RAM, in ROM, via a network interface, and so on. The present disclosure describes various novel instructions which the processing circuitry 12 can execute and the figures which follow provide further explanation of the nature of these instructions, variations in the data processing circuitry in order to support the execution of those instructions, and so on.

Figure 2A:
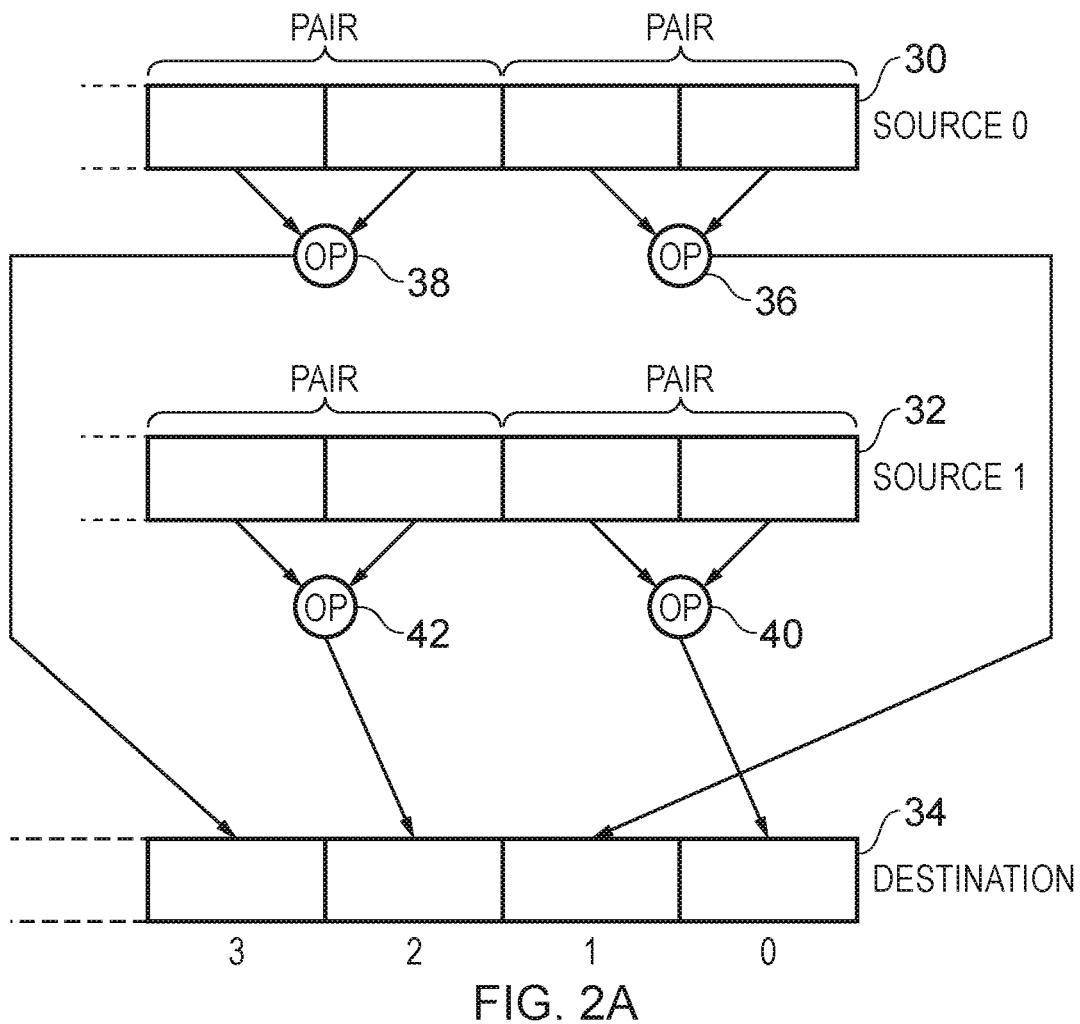
Figure 2B:
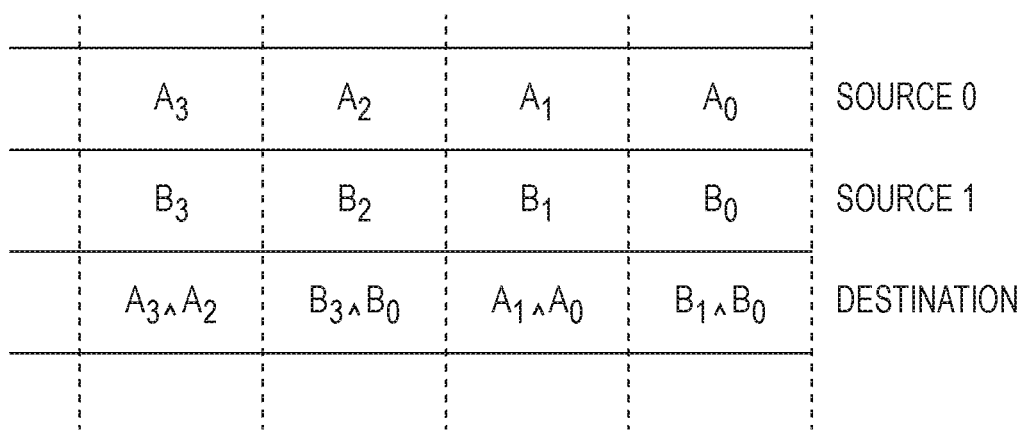

FIG. 2A schematically illustrates registers and data processing circuitry in one embodiment. In this example a source register 30 (source 0) and a source register 32 (source 1) are shown, as well as a destination register 34. This set of three registers are specified in the vector interleaving instruction which causes the illustrated processing (by enabling of the appropriate connections between the components) to be carried out. As shown, pairs of input data elements are retrieved from adjacent positions in the first and second source registers, these providing the operands to the data processing operations carried out on each in the respective "operation" (OP) circuitry 36, 38, 40, and 42. The particular operation carried out by these items of data processing circuitry may take a variety of forms but as shown in FIG. 2B by the example content of the data items in the respective positions of the three registers corresponding to the processing shown in FIG. 2A, in this example the operation is an exclusive-OR. However, in other examples the operation could be any kind of arithmetic operation (e.g. addition, multiplication, etc.), logical operation (e.g. AND, OR, etc.) or a shift operation (left or right and by any suitable number of bit positions). As shown by the result data paths leading from the data operation circuitry to the destination register 34, the result data items generated by this processing are stored in alternating positions in the destination register in dependence on the source register from which the input data pair came. Thus, in the example shown the result data items from source register 30 are stored in the odd numbered positions 1 and 3, whilst the result data items resulting from source register 32 are stored in the even numbered positions 0 and 2. It should be appreciated that this could be provided differently in response to a differently configured vector interleaving instruction such that these odd and even positions are inverted. Finally note that each of the registers in FIGS. 2A and 2B are illustrated showing two pairs of data input values being taken from each source register and four result data items being written into the destination register, but the extensions of the lines towards the left hand side of the figure illustrate that in this vectorised data processing context further iterations of the illustrated processing may be provided across the width of the vector processing capability of the apparatus provided.

Figure 3A:
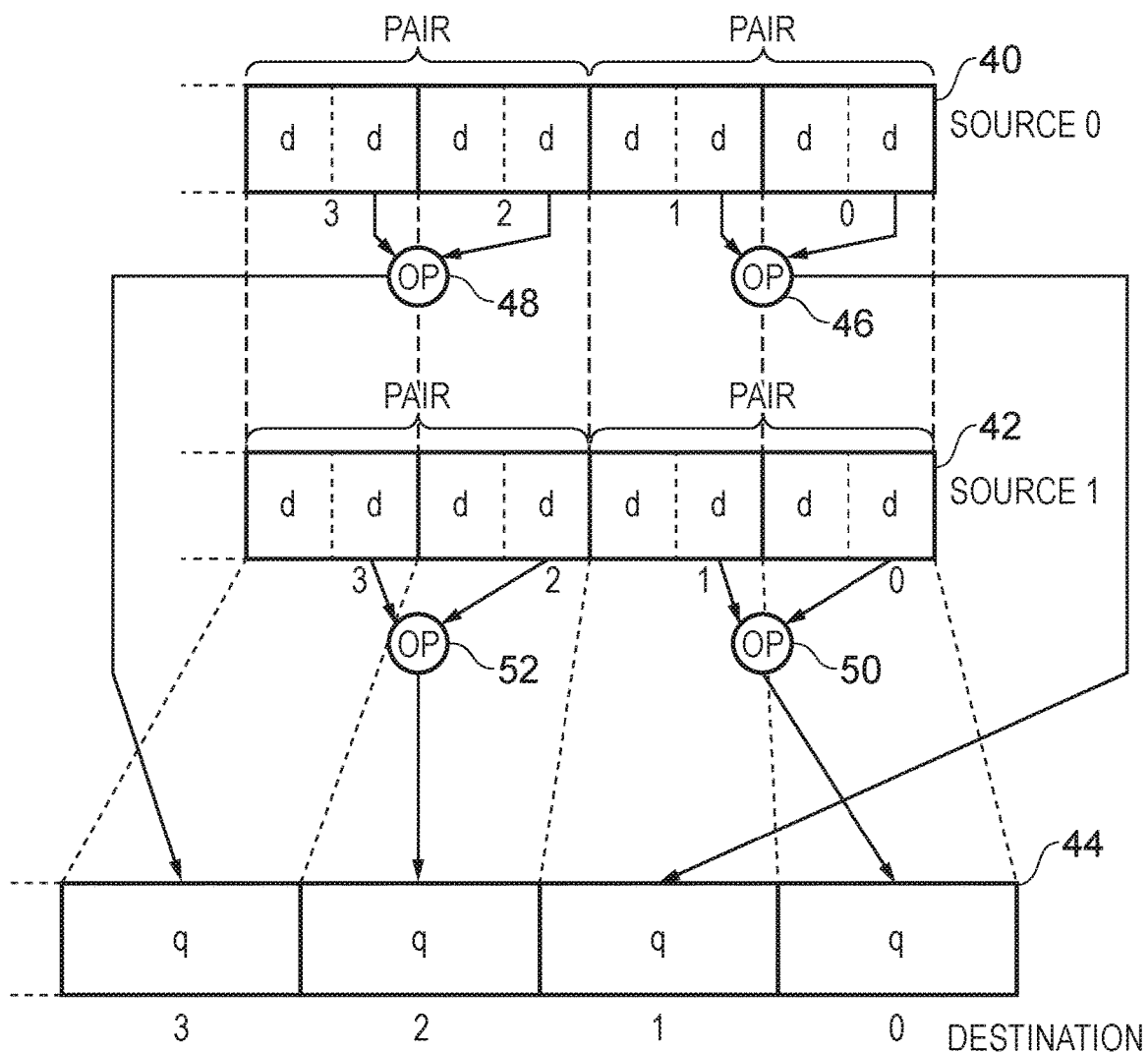
Figure 3B:
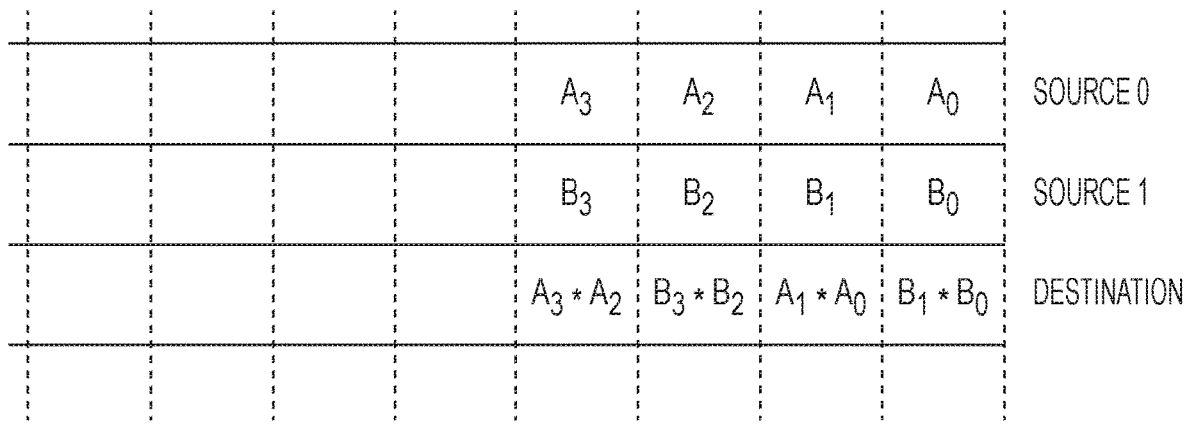

FIG. 3A schematically illustrates data processing circuitry and registers in a similar embodiment to that shown in FIGS. 2A and 2B. A first source register 40 and a second source register 42 (source registers 0 and 1) and a destination register 44 are shown. Data processing circuitry to carry out the required data processing operation ("OP") 46, 48, 50, and 52 is also shown. In this example, as illustrated by the example content given in FIG. 3B, the operation is a multiplication. As before, this operation could be any chosen arithmetic, logical, or shift operation as required. Differentiating FIGS. 3A and 2A is the fact that FIG. 3A illustrates the performance of a "widening" operation in which the size of each data item retrieved from each source register is half of the size of each resulting result data value stored in the destination register. Here the example is given of the input data items being doubles (d) and the result data items being quadruples (q). This being binary floating point format, the double input data items are each 64-bit values, whilst the quadruple values are each 128-bit values. This enables the example data processing shown, referring also to the example content of FIG. 3B, to be carried out where the operation in this example is a multiplication, and therefore this approach enables a widening, carry-less multiplication to be carried out which does not lose information. Note that also in the specific example of FIG. 3A the doubles are taken from the lower half of each 128-bit data item in the source registers, this being specifiable in the vector interleaving instruction which triggers this data processing. The converse example may also be provided in which the top half of the data item would be taken. In one example the instruction is provided in two form to support this, a "T" form (which will cause top-half content to be used) and a "B" form (which will cause bottom-half content to be used). Indeed, the present techniques provide vector interleaving instructions in which the size of the data items is specifiable across a wide range in such formats e.g. 8-bit byte, 16-bit halves, 32-bit singles, 64-bit doubles, and 128-bit quadruples. Further extensions as the capacity of such source registers and data processing circuitry increases are of course possible. Note also that where the example of FIGS. 3A and 3B gives a widening data processing operation the converse capability is also provided, wherein for a suitable data processing operation a narrower result data item is generated from wider source register input data items.

Figure 4A:
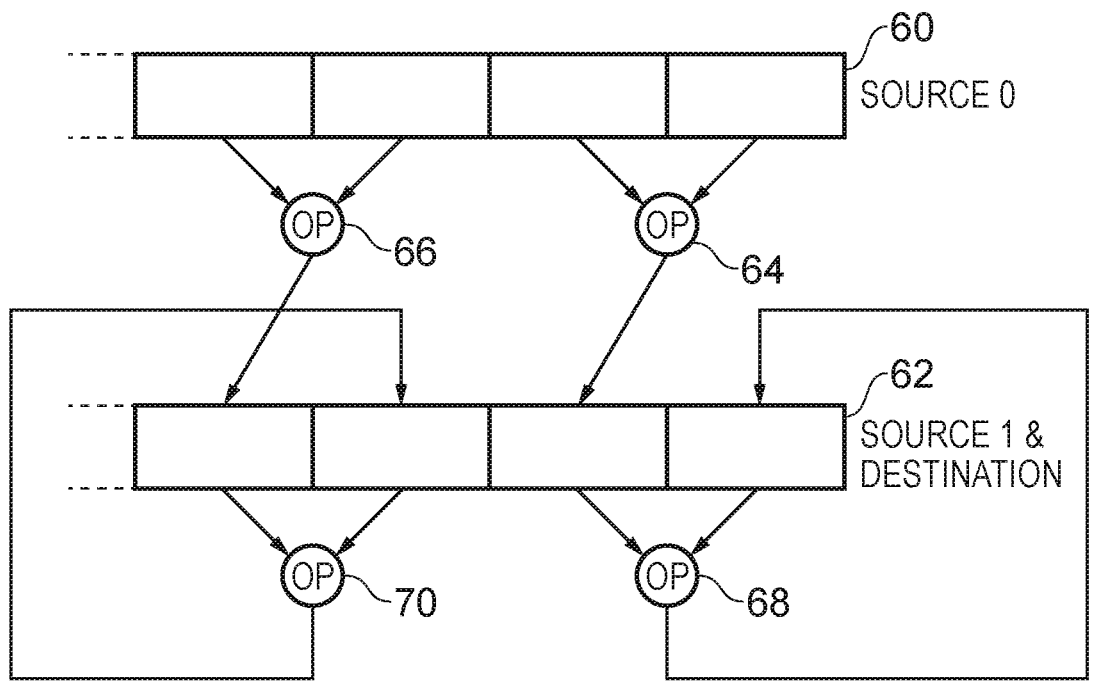
FIG. 4B shows example content in the example of FIG. 4A.
Figure 4B:
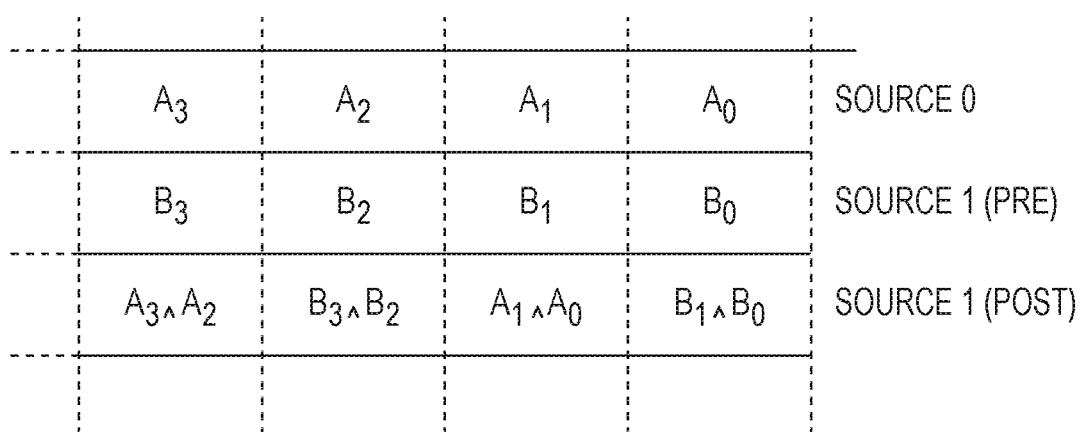

FIG. 4A shows another example in which only two registers are used, a first source register 60 and a second source register 62 which is also the destination register. In other words the result data values generated by the data processing of the operation circuitry 64, 66, 68, and 70 are stored back into the source register 62. Accordingly, this example can be said to be "destructive" in that the content of the second source register 62 is lost once the result data items have overwritten it. Example content for this set up is given in FIG. 4B, showing the content of source 0, and showing the content of source 1 both before and after the data processing. In this example the data processing is an XOR operation, but as in the other examples described above this could be any variety of arithmetic, logical, or shift operation as required.

FIG. 5A schematically illustrates a further example embodiment. In this example source registers 80 and 82 are shown as well as destination register 84. In addition in this example a predicate value 86 is also shown. This predicate value can be specified as an immediate value in the instruction or else can be specified by means of its storage location in the data processing apparatus, for example in another register. The effect of the predicate value on the data processing can be seen in FIG. 5A in that there is a correspondence between the bit positions of the predicate value and the lanes of data processing. Thus, where two bits of the predicate value are set (1) and two bits are unset (0) this effectively switches on or off as appropriate the processing performed by the data processing circuitry items 88, 90, 92, 94, 96, 98, 100 and 102. Specifically, in the example shown, no processing is performed by items 90, 94, 98, and 102, whilst 88, 92, 96, and 100 operate as described above with reference to FIGS. 2A, 3A, and 4A. In the example shown in FIG. 5A, as illustrated in FIG. 5B, the processing is an XOR operation, but as before any arithmetic, logical, or shift operation could equivalently be performed. In effect therefore the content of the destination register is only modified in those positions which receive result data items from active data processing circuitry (OP units), in FIG. 5A the unamended positions in the destination register being hatched. FIG. 5B shows the content of the destination register both before and after the data processing, demonstrating that the content of certain positions does not change.

FIG. 6 schematically illustrates a further example configuration in which a different approach to the pairings of input data items is taken. Source registers 110, and 112 are shown as well as a destination register 114. In this example the pairs span two source registers, i.e. one input operand data item is taken from the first source register whilst another input operand data item is taken from the other source register. Thus in the example of FIG. 6 data items A1 and A2 are taken from the first source register and respectively paired with data item B1 and B3 from the second source register. These provide the inputs to the data processing circuitry 114 and 116, which as labelled can be seen to perform a XOR operation (as in the previous examples, this operation may be variously defined). The result data items generated by these two items of data processing circuitry are stored in two positions in the destination register 114 which are interleaved with a second set of positions in the destination register 114 which remain unchanged by the data processing which is carried out. With respect to the example in FIG. 6 it should be appreciated that the choice of even numbered positions providing the input data items from the first source register and odd numbered positions providing the input data items in the second source register can be inverted, i.e. with odd numbered items coming from the first source register and even numbered items coming from the second source register. Similarly the choice of even numbered positions into which to write the result data items could instead be chosen to be the set of odd numbered positions with the unchanged data items in the destination register then of course occupying the even numbered positions. Instructions supporting all these permutations either by means of suitable flags in a given instruction or by separately defined instructions for each version can be provided.

FIGS. 7 and 8 now illustrate and describe one example embodiment of the present techniques when used in the context of polynomial multiplication. Here the present techniques provide in particular a vector interleaving instruction which specifies an exclusive OR operation and moreover this exclusive OR operation is provided in two formats, referred to in the example of FIG. 8 as EORBT and EORTB, where the last two letters B and T refer to "bottom" and "top", namely the lower and upper halves of a given data item indicating the manner in which these should be handled, as will be explained in more detail below. These particular instructions are beneficial to accelerate polynomial multiplication (in the Galois field). Moreover, this example is one of carry-less multiplication. Thus, beginning with some definitions shown in FIG. 7, the Karatsuba approach is taken such that:

$$\{X1,X0\}*\{Y1,Y0\}=H\_128\{P1,P0\char`\^P1\char`\^Q1\char`\^R1\},$$
$$L\_128\{Q1 \char`\^P0 \char`\^Q0 \char`\^R0,Q0\}$$

where:
$\{P1, P0\}=X1*Y1$
$\{Q1, Q0\}=X0*Y0$
$\{R1, R0\}=(X0\char`\^X1)*(Y0\char`\^Y1)$
Further, let vectors zX and zY be defined:
$zX=\{\ldots X1, X0\}$ and $zY=\{\ldots Y1, Y0\}$
The following instruction sequence (using the above mentioned EORTB and EORBT instructions) can then be used to carry out the required calculation.
PMULLB z1.q, zY.d, zX.d//z1={ . . . Q1, Q0}
PMULLT z2.q, zY.d, zX.d//z2={ . . . P1, P0}
EORBT zX.q, zX.d, zX.d
EORBT zY.q, zY.d, zY.d
PMULLB z3.q, zX.d, zY.d//z3={ . . . R1, R0}
EOR z3.d, z3.d, z2.d
EOR z3.d, z3.d, z1.d//z3={ . . . P1^Q1^R1, P0^Q0^R0}
EORTB z1.q, z1.d, z3.d
EORTB z2.q, z2.d, z3.d Note therefore that the 256-bit result of each 128-bit wide multiplication is split between the registers z1 and z2, with z1 containing the bottom 128-bits and z2 containing the top 128-bits. This may for example work efficiently in an implementation in which the minimum vector length is 128-bits and therefore this example sequence of instruction (code) can work for any given vector length within such a system. FIG. 8 shows the content of the respective data items of the registers zX, zY, z1, z2 and z3 as these instructions are carried out to generate these respective bottom 128-bits (which finally result in register z1) and the top 128-bits (which finally result in the register z2).

FIG. 9 shows a sequence of steps which are taken in the method of one embodiment when a vector interleaving instruction of the present techniques is encountered by the apparatus. The flow can be considered to begin at step 200 where the next instruction in the sequence of instructions received by the instruction decoder circuitry is decoded. It is then determined at step 202 if this is a vector interleaving instruction. If it is not then the flow proceeds via step 204 where this other variety of instruction is processed as appropriate (the present description not being concerned with other types of instructions). If however at step 202 this is found to be a vector interleaving instruction then the flow proceeds to step 206 where input data items are retrieved from the first source register and to step 208 where input data items are retrieved from the second source register. It will be appreciated having read the description of the preceding figures that steps 206 and 208 need not be carried out in sequence, and indeed will typically be carried out in parallel, but are merely illustrated in this sequential fashion in FIG. 9 for simplicity. At step 210 the data processing operation defined by this vector interleaving instruction is carried out using pairs of input data items as defined by the vector interleaving instruction and at step 212 the result data items are stored into alternating positions in the destination register as appropriate to the particular type of vector interleaving instruction encountered. The flow then returns to step 200.

FIG. 10 shows a sequence of steps which are taken in the method of another embodiment, giving further detail of an embodiment in which different types of vector interleaving instruction may be encountered. The flow begins at step 220 where the next instruction received by the instruction decoder circuitry is decoded. If this is not found (at step 222) to be a vector interleaving instruction then the flow proceeds via step 224 where this other type of instruction is processed as appropriate (again, this not being the concern of the present disclosure). When this is a vector interleaving instruction the flow proceeds to step 224, where it is determined if this is a "pairwise" or a "diagonal" style of vector interleaving instruction. In the case where this is a pairwise vector interleaving instruction then the flow proceeds to step 226, where a first set of pairs of data items are retrieved from the first source register and a second set of pairs of data items are retrieved from the second source register (as specified in the instruction). Then at step 228 these pairs are subjected to the required data processing operation specified by the instruction. Then at step 230 the results of the first pairs of data items are stored to odd positions in the destination register, whilst the results from the second set of pairs of data items are stored to even positions in the destination register. As shown in brackets in step 230 this choice of odd and even could be inverted (e.g. by two variants of the pairwise instruction). The flow then returns to step 220. Returning to consider step 224, if this is instead a diagonal vector interleaving instruction then the flow proceeds from step 224 to step 232, where pairs of input data items from diagonally adjacent positions in the first and second source registers are retrieved and at step 234 these are subjected to the data processing operation defined by the vector interleaving instruction. Then at step 236 the results of the data processing operations are stored to odd positions in the destination register leaving even positions unamended (unchanged). The bracketed words "even" and "odd" in step 236 of FIG. 10 indicate that this choice of odd and even could be inverted (e.g. by two variants of the diagonal instruction). The flow then returns to step 220.

FIG. 11 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the application program interface of the hardware architecture being modelled by the simulator program 710. Thus, the program instructions of the target code 700, including the vector interleaving instructions described above, may be executed from within the instruction execution environment using the simulator program 710, so that a host computer 730 which does not actually have the hardware features of the apparatus 2 discussed above can emulate these features.

In brief overall summary vector interleaving techniques in a data processing apparatus are disclosed, comprising apparatuses, instructions, methods of operating the apparatuses, and virtual machine implementations. A vector interleaving instruction specifies a first source register, second source register, and destination register. A first set of input data items is retrieved from the first source register and a second set of input data items from the second source register. A data processing operation is performed on selected input data item pairs taken from the first and second set of input data items to generate a set of result data items, which are stored as a result data vector in the destination register. First source register dependent result data items are stored in a first set of alternating positions in the destination data vector and second source register dependent result data items are stored in a second set of alternating positions in the destination data vector.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   instruction decoder circuitry to decode instructions; and
   data processing circuitry to selectively apply vector processing operations specified by the instructions to input data vectors comprising a plurality of input data items at respective positions in the input data vectors, wherein the instruction decoder circuitry is responsive to a vector interleaving instruction specifying a first source register, a second source register, and a destination register to generate control signals to control the data processing circuitry to carry out a vector interleaving process to:

retrieve a first set of input data items from the first source register;

retrieve a second set of input data items from the second source register;

perform a data processing operation on at least selected input data item pairs taken from the first and second set of input data items to generate a set of result data items; and store the set of result data items as a result data vector in the destination register, wherein first source register dependent result data items which have a first source register content dependency are stored in a first set of alternating positions in the destination data vector, and wherein second source register dependent result data items which have a second source register content dependency are stored in a second set of alternating positions in the destination data vector, wherein:

the selected input data item pairs taken from the first and second set of input data items comprise diagonal input data item pairs formed of alternating input data items in the first source register paired with alternating input data items in the second source register; and the first source register dependent result data items and the second source register dependent result data items are a same set of result data items, and the first set of alternating positions and the second set of alternating positions are a same set of alternating positions in the destination data vector.

2. The apparatus as claimed in claim 1, wherein the first set of alternating positions and the second set of alternating positions alternate with a further set of positions at which a set of prior data items remain in the destination data vector, wherein the set of prior data items are present in the further set of positions in the destination data vector before the data processing circuitry begins the vector interleaving process.

3. The apparatus as claimed in claim 2, wherein the first set of positions are an even numbered set of positions in the destination data vector and the further set of positions are an odd numbered set of positions in the destination data vector.

4. The apparatus as claimed in claim 2, wherein the first set of positions are an odd numbered set of positions in the destination data vector and the further set of positions are an even numbered set of positions in the destination data vector.

5. The apparatus as claimed in claim 1, wherein the alternating input data items in the first source register are retrieved from an even numbered set of positions in the first source register and the alternating input data items in the second source register are retrieved from an odd numbered set of positions in the second source register.

6. The apparatus as claimed in claim 1, wherein the alternating input data items in the first source register are retrieved from an odd numbered set of positions in the first source register and the alternating input data items in the second source register are retrieved from an even numbered set of positions in the second source register.

7. The apparatus as claimed in claim 1, wherein the data processing operation is an arithmetic operation, a logical operation, or a shift operation.

8. The apparatus as claimed in claim 1, wherein the destination register specified in the vector interleaving instruction is one of the first source register and the second source register.

9. The apparatus as claimed in claim 1, wherein the vector interleaving instruction further specifies a predication value comprising predication bits corresponding to the respective positions in the input data vectors, and the data processing circuitry is further responsive to an unset predication bit in the predication value to suppress involvement of input data item of the first set of input data items and the second set of input data items in the vector interleaving process which correspond to the unset predication bit.

10. The apparatus as claimed in claim 1, wherein the vector interleaving instruction further specifies a first data item size of the first set of input data items, a second data item size of the second set of input data items, and a result data item size of the set of result data items.

11. The apparatus as claimed in claim 10, wherein the first data item size and the second data item size of the second set of input data items is smaller than the result data item size of the set of result data items.

12. The apparatus as claimed in claim 10, wherein the first data item size and the second data item size of the second set of input data items is larger than the result data item size of the set of result data items.

13. A method of operating a data processing apparatus comprising the steps of:

decoding instructions;

selectively applying vector processing operations specified by the instructions to input data vectors comprising a plurality of input data items at respective positions in the input data vectors;

generating control signals in response to a vector interleaving instruction specifying a first source register, a second source register, and a destination register of the apparatus to control data processing circuitry of the apparatus to carry out a vector interleaving process comprising:

retrieving a first set of input data items from the first source register;

retrieving a second set of input data items from the second source register;

performing a data processing operation on at least selected input data item pairs taken from the first and second set of input data items to generate a set of result data items; and storing the set of result data items as a result data vector in the destination register, wherein first source register dependent result data items which have a first source register content dependency are stored in a first set of alternating positions in the destination data vector, and wherein second source register dependent result data items which have a second source register content dependency are stored in a second set of alternating positions in the destination data vector, wherein:

the selected input data item pairs taken from the first and second set of input data items comprise diagonal input data item pairs formed of alternating input data items in the first source register paired with alternating input data items in the second source register; and the first source register dependent result data items and the second source register dependent result data items are a same set of result data items, and the first set of alternating positions and the second set of alternating positions are a same set of alternating positions in the destination data vector.

14. An apparatus comprising:

instruction decoder circuitry to decode instructions; and data processing circuitry to selectively apply vector processing operations specified by the instructions to input data vectors comprising a plurality of input data items at respective positions in the input data vectors, wherein the instruction decoder circuitry is responsive to a vector interleaving instruction specifying a first source register, a second source register, and a destination register to generate control signals to control the data processing circuitry to carry out a vector interleaving process to:

retrieve a first set of input data items from the first source register;

retrieve a second set of input data items from the second source register;

perform a data processing operation on at least selected input data item pairs taken from the first and second set of input data items to generate a set of result data items; and store the set of result data items as a result data vector in the destination register, wherein first source register dependent result data items which have a first source register content dependency are stored in a first set of alternating positions in the destination data vector, and wherein second source register dependent result data items which have a second source register content dependency are stored in a second set of alternating positions in the destination data vector, wherein the vector interleaving instruction further specifies at least one of:

a predication value comprising predication bits corresponding to the respective positions in the input data vectors, and the data processing circuitry is further responsive to an unset predication bit in the predication value to suppress involvement of input data item of the first set of input data items and the second set of input data items in the vector interleaving process which correspond to the unset predication bit; and a first data item size of the first set of input data items, a second data item size of the second set of input data items, and a result data item size of the set of result data items.

* * * * *